(12) United States Patent
Pinarbasi

(10) Patent No.: US 6,460,243 B1
(45) Date of Patent: Oct. 8, 2002

(54) METHOD OF MAKING LOW STRESS AND LOW RESISTANCE RHODIUM (RH) LEADS

(75) Inventor: Mustafa Pinarbasi, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/447,201

(22) Filed: Nov. 22, 1999

(51) Int. Cl.[7] .......................... G11B 5/127; H04R 31/00
(52) U.S. Cl. ...................... 29/603.14; 29/603.07; 29/603.13; 29/603.27; 148/538; 148/553; 148/559; 360/317; 360/322; 360/324.1; 427/523; 427/569; 427/570; 427/573; 427/576; 427/577
(58) Field of Search .................. 29/603.07, 603.13, 29/603.14, 603.27; 360/317, 322, 324.1; 427/523, 569, 570, 573, 576, 577; 148/538, 553, 559

(56) References Cited

U.S. PATENT DOCUMENTS

| | | | |
|---|---|---|---|
| 4,911,809 A | * 3/1990 | Wort | 204/192.11 |
| 4,936,653 A | * 6/1990 | Schemmel | 350/164 |
| 5,432,151 A | * 7/1995 | Russo | 505/474 |
| 5,434,826 A | 7/1995 | Ravipati et al. | 360/113 X |
| 5,438,747 A | * 8/1995 | Krounbi | 29/603 |
| 5,649,351 A | * 7/1997 | Cole | 29/603.14 |
| 5,668,688 A | 9/1997 | Dykes et al. | 360/113 |
| 5,784,225 A | * 7/1998 | Saito | 360/113 |
| 5,805,391 A | * 9/1998 | Chang | 360/113 |
| 5,807,774 A | 9/1998 | Desu et al. | 438/240 |
| 5,809,637 A | * 9/1998 | Rottmayer | 29/603.15 |
| 5,850,324 A | * 12/1998 | Wu | 360/113 |
| 51,999 A | * 5/1999 | Armstong | 29/603.14 |
| 6,007,908 A | * 12/1999 | Reece | 428/334 |
| 6,063,436 A | * 5/2000 | Prvell | 427/162 |
| 6,069,775 A | * 5/2000 | Chang | 360/126 |
| 6,105,237 A | * 8/2000 | Gill | 29/603.08 |
| 6,122,150 A | * 9/2000 | Gill | 360/324.11 |
| 6,158,108 A | * 12/2000 | Seagle | 29/603.14 |
| 6,163,442 A | * 12/2000 | Gill | 360/317 |
| 6,178,072 B1 | * 1/2001 | Gill | 360/324.11 |
| 6,181,534 B1 | * 1/2001 | Gill | 360/324.11 |
| 6,208,492 B1 | * 3/2001 | Pinarbasi | 360/324.11 |
| 6,219,208 B1 | * 4/2001 | Gill | 360/324.1 |
| 6,226,158 B1 | * 5/2001 | Pinarbasi | 360/322 |
| 6,230,390 B1 | * 5/2001 | Guo | 29/603.14 |
| 6,249,406 B1 | * 6/2001 | Gill | 360/324.11 |
| 6,252,750 B1 | * 6/2001 | Gill | 360/324.11 |

FOREIGN PATENT DOCUMENTS

| | | | |
|---|---|---|---|
| GB | 552890 | 7/1993 | G01R/33/06 |
| GB | 590905 | 4/1994 | G11B/5/39 |
| JP | 62-222616 | 9/1987 | H01G/4/30 |
| JP | 407296339 A | * 11/1995 | |
| JP | 411086233 A | * 3/1999 | |
| SU | 716076 | 2/1980 | J01H/11/04 |

* cited by examiner

Primary Examiner—Peter Vo
Assistant Examiner—Paul D Kim
(74) Attorney, Agent, or Firm—Ervin F. Johnston (57) ABSTRACT

A method of making rhodium (Rh) lead layers for a read sensor comprises a first step of obliquely ion beam sputtering the rhodium (Rh) lead layer followed by a second step of annealing. This method results in rhodium (Rh) lead layers which have reduced stress and less resistance, making them highly desirable for lead layers of a sensor in a read head.

11 Claims, 10 Drawing Sheets

FIG. 11
(ABS)

METHOD OF MAKING LOW STRESS AND LOW RESISTANCE RHODIUM (RH) LEADS

BACKGROUND OF THE INVENTION

1. Field of the Invention

The present invention relates to a method of making low stress and low resistance rhodium (Rh) leads and, more particularly, to a method of making such leads by oblique ion beam sputtering followed by annealing.

2. Description of the Related Art

The heart of a computer is an assembly that is referred to as a magnetic disk drive. The magnetic disk drive includes a rotating magnetic disk, a slider that has write and read heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic signal fields to and reading magnetic signal fields from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes the aforementioned signal fields in tracks on moving media, such as in circular tracks on a rotating disk.

The read head includes a sensor that is located between nonmagnetic electrically insulative first and second read gap layers and the first and second read gap layers are located between ferromagnetic first and second shield layers. In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to the aforementioned signal fields. The magnetization of the pinned layer is typically pinned by exchange coupling with an antiferromagnetic layer. Rotation of the magnetic moment of the free layer relative to the pinned layer changes the resistance of the spin valve sensor. A sense current $I_s$ is conducted through the sensor so that the resistance changes cause potential changes in the aforementioned processing circuitry that are processed as playback signals. The spin valve sensor is characterized by a magnetoresistive (MR) coefficient dr/R, where dr is the change in resistance of the spin valve sensor and R is the resistance of the spin valve sensor before the change.

Because of high conductance (low resistance) and resistance to corrosion, gold (Au) is a desirable material for the aforementioned first and second leads that are connected to the read sensor. Pure gold (Au), when used as conductor leads, however, presents a problem due to nodule formation of the gold at the ABS. This is due to pressure and high temperatures within the head during operating conditions of the read head within a magnetic disk drive. The operating temperatures can vary between 80° C. –120° C. Pressure on the leads increases with an increase in temperature due to expansion of layers adjacent the leads such as the first and second read gap layers and the first and second shield layers which are adjacent the read gap layers. With pressure due to the aforementioned temperatures the gold (Au), which is soft, is squeezed out of the leads at the ABS of the read head causing the aforementioned nodules. The nodules can short the leads to the first and second shield layers or short across edge portions of sensitive elements of the read sensor causing a failure of the read head.

Because of the problems with gold (Au), leads have been made from tantalum (Ta) which does not have the nodule problem. Unfortunately, tantalum (Ta) has a significantly higher resistance than gold (Au) which results in increased noise of the read head unless the thickness of the tantalum (Ta) lead layers is increased. Unfortunately, an increase in thickness of the lead layers causes steps adjacent the read sensor which are replicated by subsequent layers all the way to the write gap which can cause the write gap of the write head to be curved. This is known in the art as write gap curvature and causes the write head to write curved magnetic impressions into tracks of a rotating magnetic disk which are then read by a sensor that reads straight across. This causes a reduction in the read signal which equates to less storage capacity of the magnetic disk drive.

Other nonmagnetic metals considered for leads are copper (Cu), tungsten (W), ruthenium (Ru), molybdenum (Mo) and rhodium (Rh). Copper (Cu) and tungsten (W) have a corrosion problem because of a necessary exposure of edge surfaces of all leads at the air bearing surface. Ruthenium (Ru) suffers from severe contamination due to particle generation during conventional sputter deposition. Conventional sputtering is any sputtering without an ion beam gun. Molybdenum (Mo) has a high corrosion at the ABS. Rhodium (Rh) does not suffer from the formation of nodules, corrosion at the air bearing surface or contamination, but has a relatively high stress and resistance during conventional sputtering in its as deposited state which is not improved with annealing. European Patent Application No. 93300239.6 with Publication No. 0552890A2 published Jul. 28, 1993 teaches that annealing rhodium(Rh) leads at 250° C. for up to 7 hours does not reduce the as deposited resistance. This means that the microstructure of the rhodium (Rh) lead has not changed which indicates that the as deposited stress has not changed. It would be highly desirable if rhodium (Rh) could be employed for leads with lower stress and resistance. The lower resistance would enable the leads to be employed with less resistance generated noise and/or thinner leads so as to reduce write gap curvature. The high stress can cause the rhodium (Rh) lead layers to separate from the sensor causing an open circuit that destroys the read head.

SUMMARY OF THE INVENTION

A method is provided for forming low stress and resistance rhodium (Rh) conductor leads for a read sensor. In the present method a sputtering system has a sputtering chamber which has a target of the material to be sputtered, namely rhodium (Rh), a substrate supporting a wafer upon which the rhodium (Rh) leads are to be formed and an ion beam gun which directs an ion beam onto the target for sputtering rhodium (Rh) atoms from the target onto the wafer. The sputtering chamber typically has an outlet for drawing a vacuum and an inlet for inserting an inert gas, such as argon (Ar), into the chamber. In the present invention the surface planes of the target and the substrate are oriented at an angle with respect to one another which results in what is referred to hereinafter as oblique ion beam sputtering. The formation of the rhodium (Rh) leads by oblique ion beam sputtering is followed by annealing the leads at a high temperature for a predetermined period of time. In the fabrication of magnetic read and write heads the annealing can take place upon the annealing of photoresist layers to form insulation layers for the insulation stack of the write head.

An object of the present invention is to provide improved lead layers for a read sensor by forming them with oblique ion beam sputter deposition and annealing.

Another object is provide rhodium (Rh) lead layers for a read sensor which have reduced stress and resistance as compared to rhodium (Rh) lead layers formed by prior art methods.

A further object is to provide a method of making an electrical lead for a device which has reduced stress and lower resistance.

Still another object is to provide a method of making rhodium (Rh) leads for a read head which have reduced stress and lower resistance.

Other objects and advantages of the invention will become apparent upon reading the following description taken together with the accompanying drawings.

DESCRIPTION OF THE PREFERRED EMBODIMENTS

MAGNETIC DISK DRIVE

Figure 1:
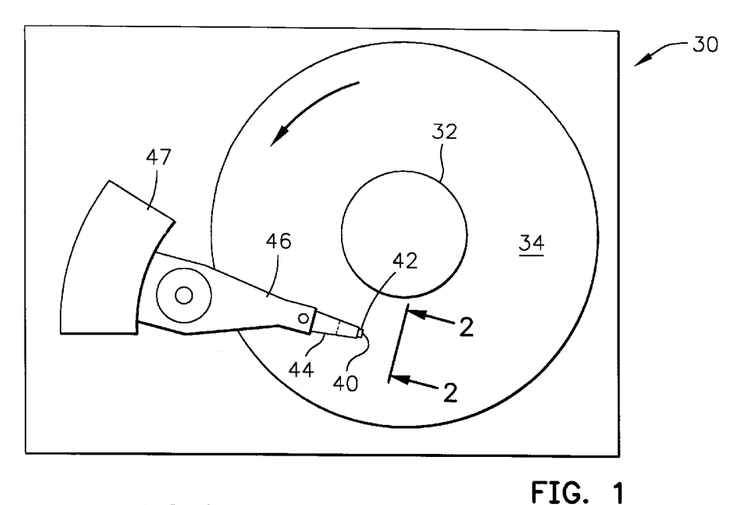
FIG. 1 is a plan view of an exemplary magnetic disk drive.
Figure 2:
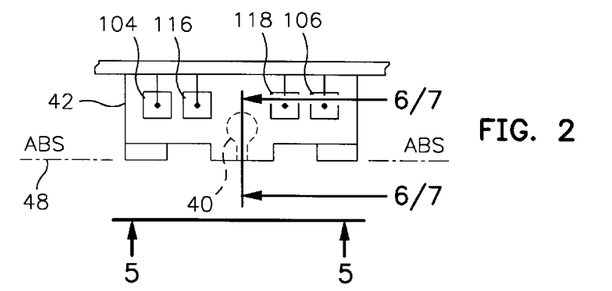
FIG. 2 is an end view of a slider with a magnetic head of the disk drive as seen in plane 2—2.
Figure 3:
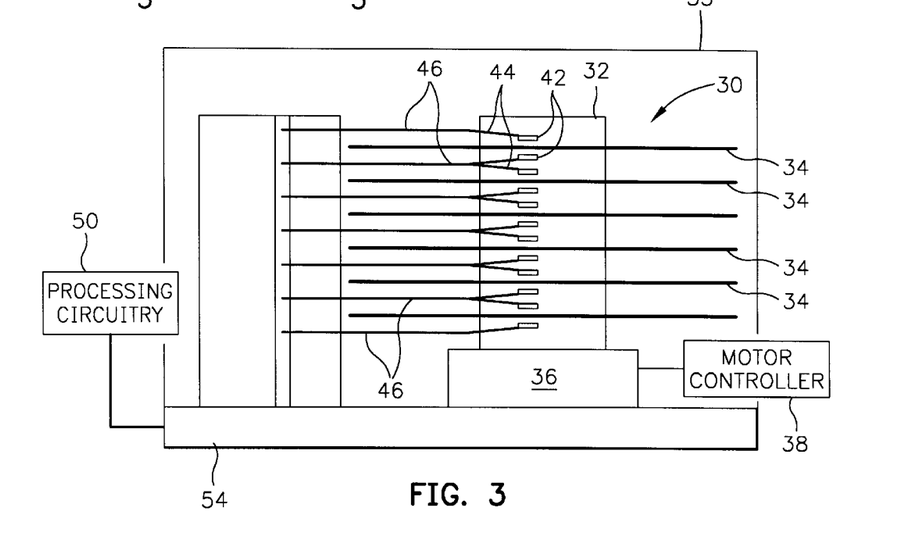
FIG. 3 is an elevation view of the magnetic disk drive wherein multiple disks and magnetic heads are employed.
Figure 4:
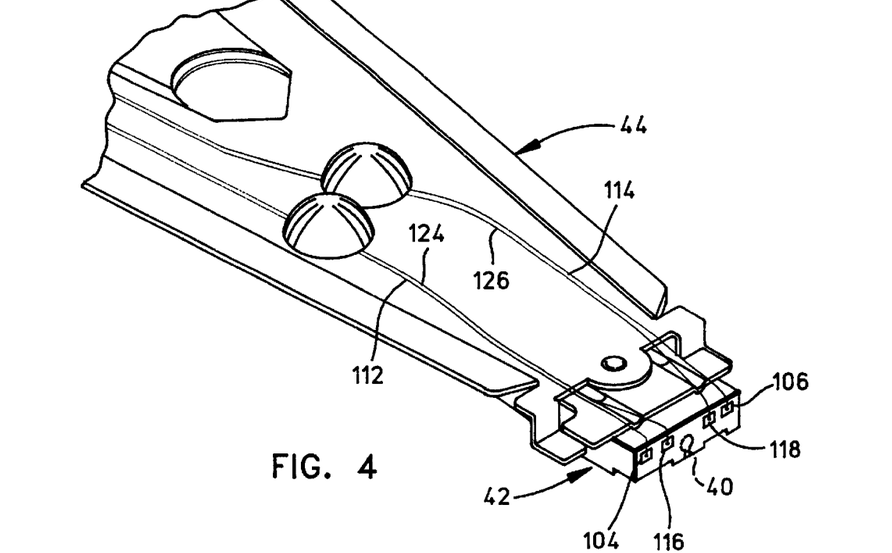
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
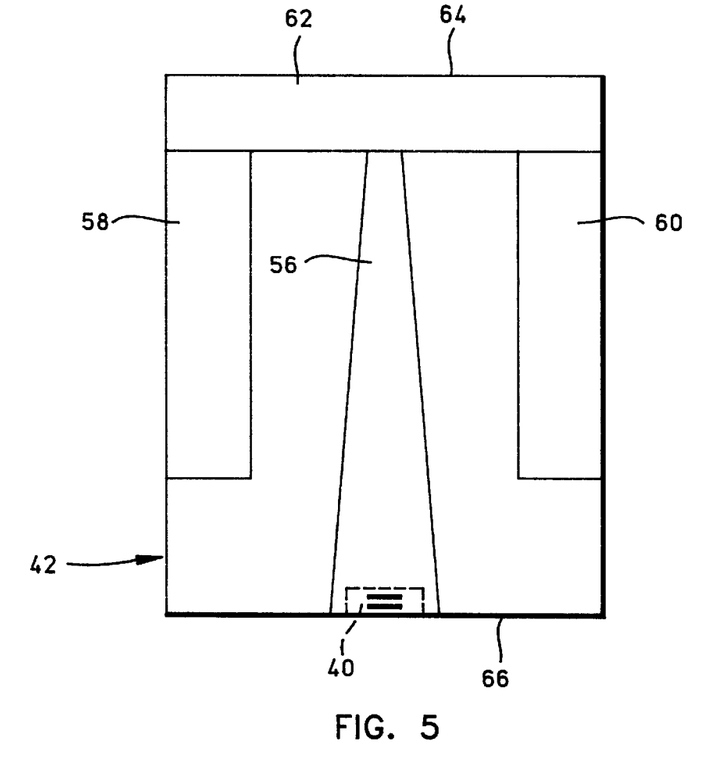
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
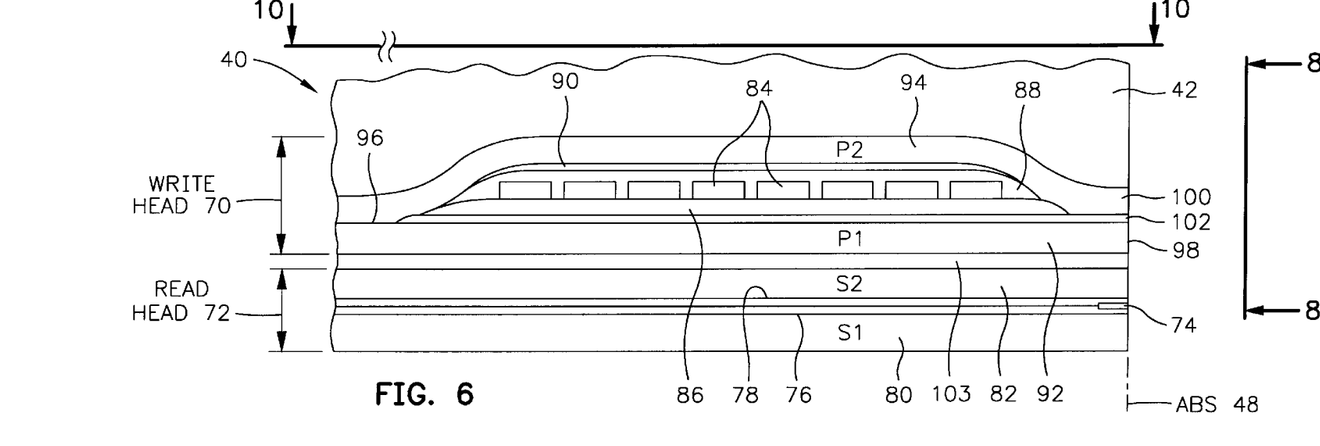
FIG. 6 is a partial view of the slider and a piggyback magnetic head as seen in plane 6—6 of FIG. 2.
Figure 8:
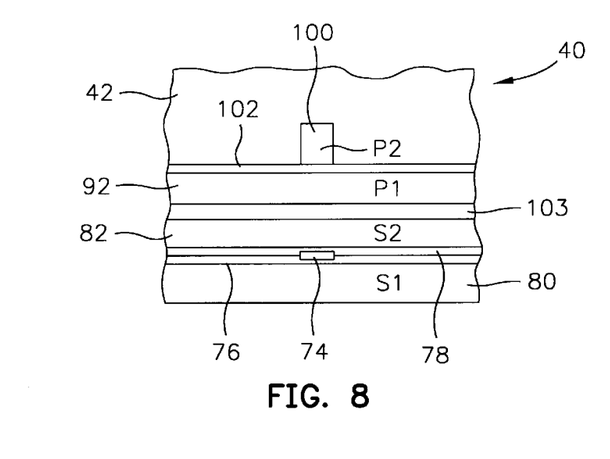
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 6) to leads 124 and 126 on the suspension.

Figure 7:
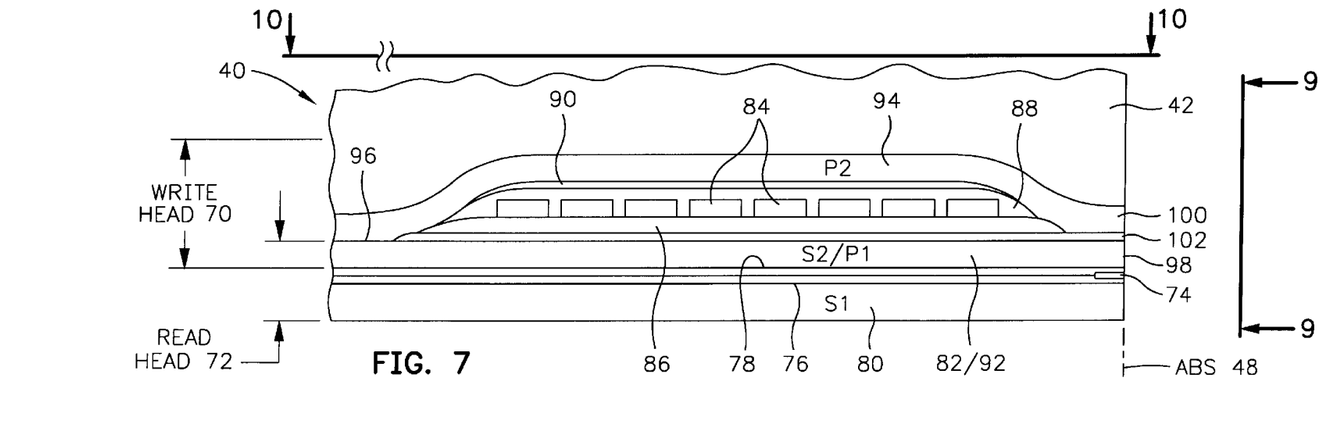
FIG. 7 is a partial view of the slider and a merged magnetic head as seen in plane 7—7 of FIG. 2.
Figure 9:
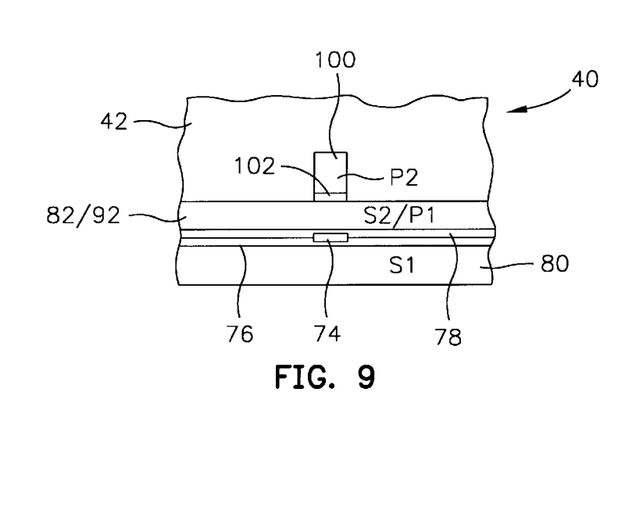
FIG. 9 is a partial ABS view of the slider taken along plane 9—9 of FIG. 7 to show the read and write elements of the merged magnetic head.
Figure 10:
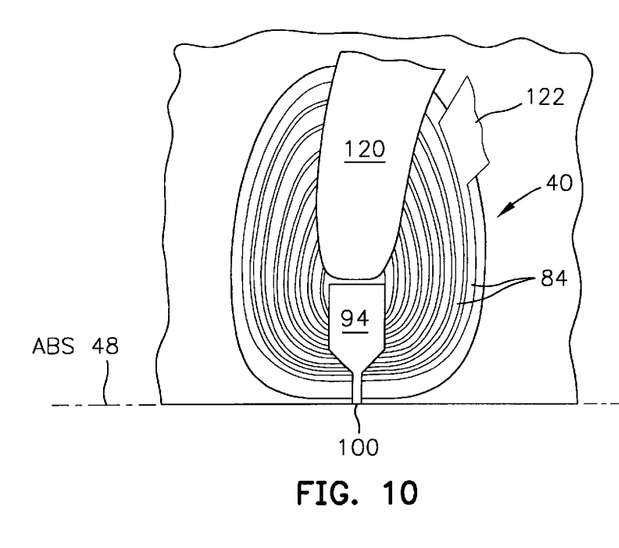
FIG. 10 is a view taken along plane 10—10 of FIGS. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
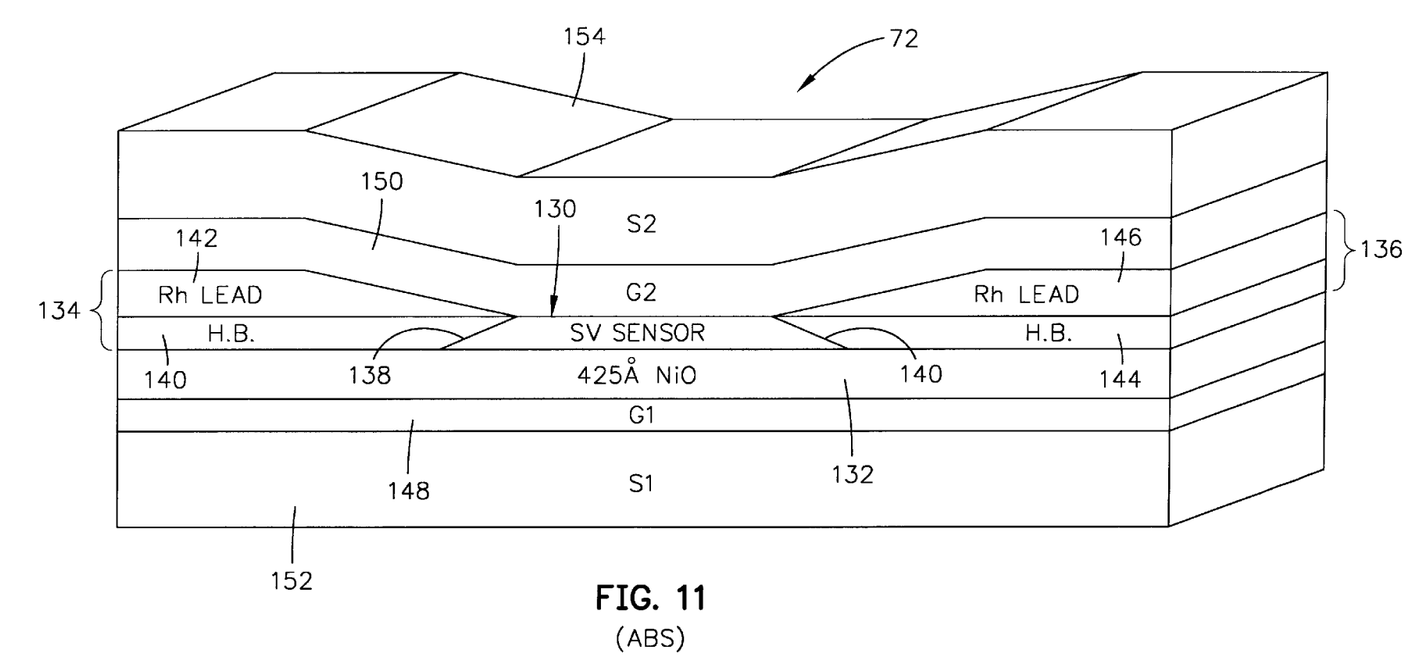
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer is preferably 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
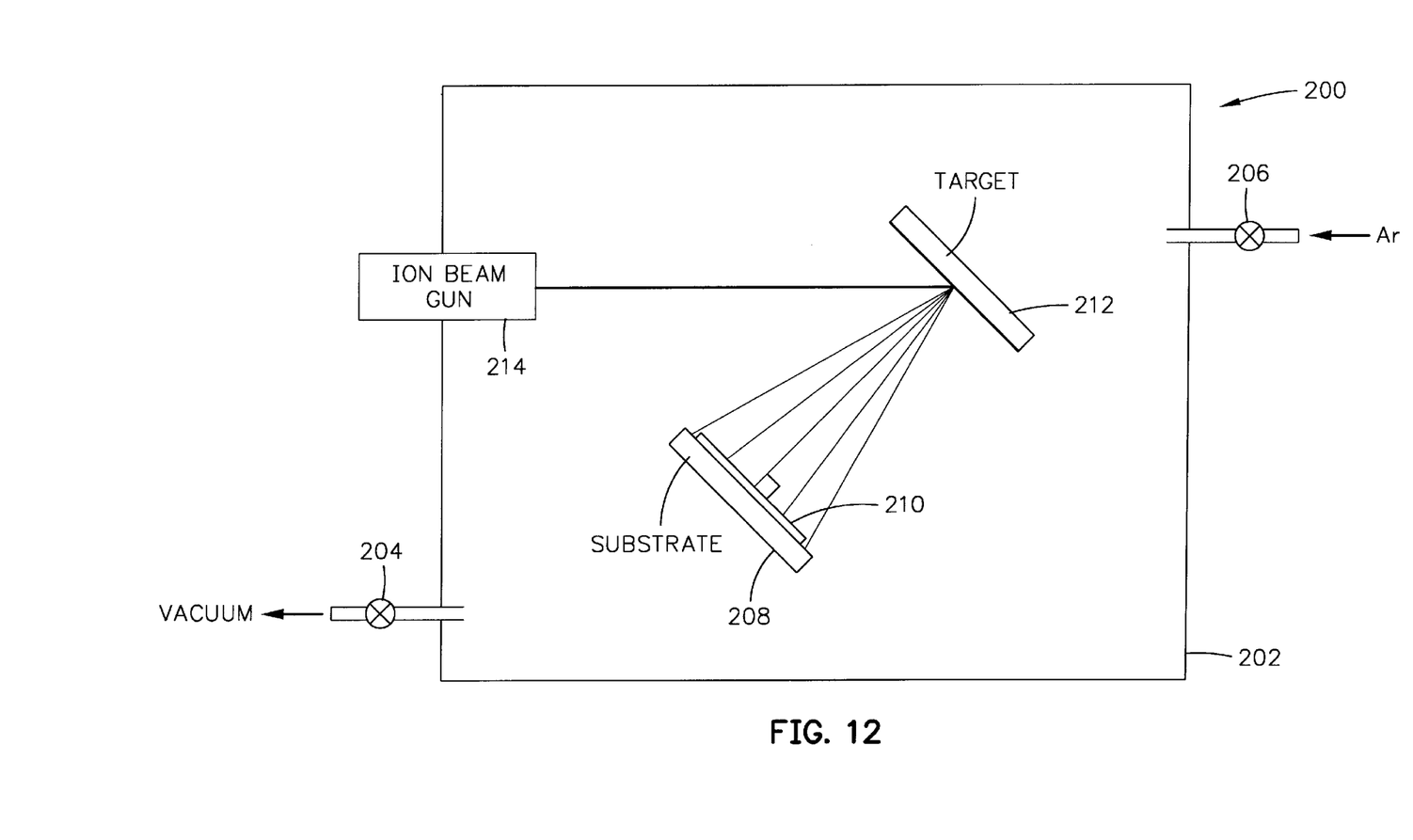
FIG. 12 is a schematic illustration of an ion beam sputtering system wherein surface planes of the substrate and the target are parallel with respect to one another.

A sputtering system 200 for forming layers of a read head is shown in FIG. 12. The sputtering system 200 includes a chamber 202 which has a valve controlled outlet 204 and a valve control inlet 206. The outlet 204 is for the purpose of drawing a vacuum in the chamber and the inlet 206 is for the purpose of introducing an inert gas, such as Argon (Ar), into the chamber. Mounted within the chamber is a substrate 208 which supports a wafer 210 upon which layers of the read head may be formed. Opposite the wafer and substrate is a target 212 composed of the material to be sputter deposited on the wafer 210. An ion beam gun 214 is mounted at one end of the chamber 202 for the purpose of directing a beam of ions onto the target 212. Within the ion beam gun high energy electrons collide with atoms, such as argon (Ar) or xenon (Xe) atoms, knocking out one of the electrons of each atom causing atoms to be ionized with a positive charge. Electrons knocked out of the atoms have high energy which knock out additional electrons from other atoms which creates a plasma within the ion beam gun 214. Ionized atoms from the ion beam gun strike the target 212 which causes the material of the target to be sputtered and deposited on the wafer 210. In the sputtering system 200 the nominal planes of the substrate 208 and the target 212 are substantially parallel with respect to one another. When the nominal planes are parallel this results in non-oblique sputtering of atoms onto the substrate.

Figure 13:
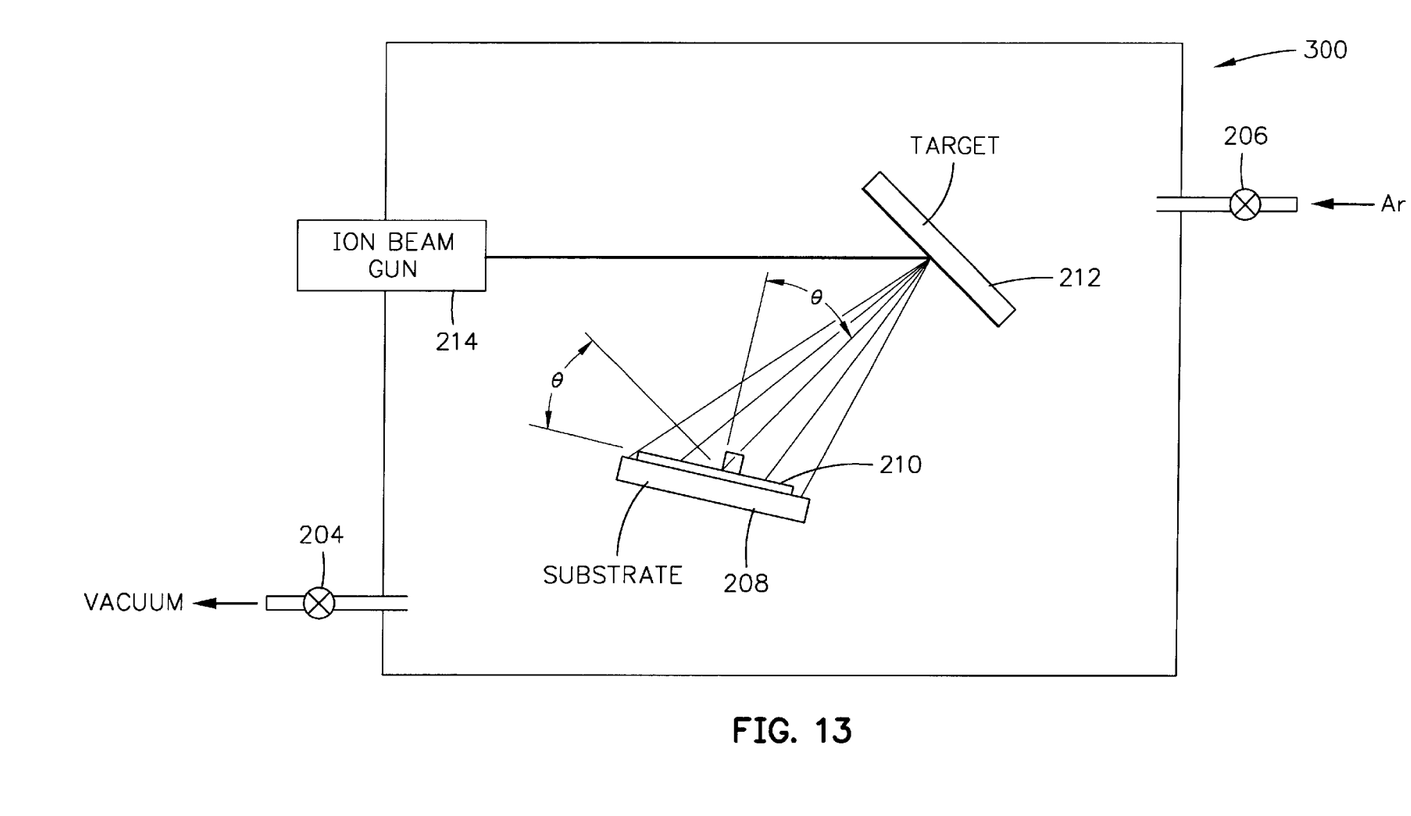
FIG. 13 illustrates an ion beam sputtering system, which is the same as the sputtering system in FIG. 12, except the surface planes of the substrate and the target are at an angle with respect to one another.

A sputtering system 300 for forming improved rhodium (Rh) leads 142 and 146 in FIG. 11 is shown in FIG. 13. The sputtering chamber 300 is the same as the sputtering chamber 200 except for the angle of the substrate 208 and the wafer 210. The difference is that the nominal surface planes of the substrate 208 and the target 212 are oriented at a substrate/target angle θ with respect to one another instead of being parallel with respect to one another as shown in FIG. 12. With this arrangement atoms of the material sputtered from the target 212 are deposited on the wafer 210 at a sputtering angle θ to a normal to the nominal surface plane of the substrate 208, which angle is also equal to the substrate/target angle θ. While the substrate/target or sputtering angle is shown in the plane of the paper, the substrate/target or sputtering angle θ can be located at any angle within 360° commencing with the plane of the paper and rotated into and out of the paper back to the plane of the paper which will be described in more detail hereinafter. The preferred substrate/target or sputtering angle θ is from 5° to 60°. The chamber pressure can be $10^{-4}$ torr and the working gas may be argon (Ar), krypton (Kr) or xenon (Xe). The target material is rhodium (Rh).

Figure 14:
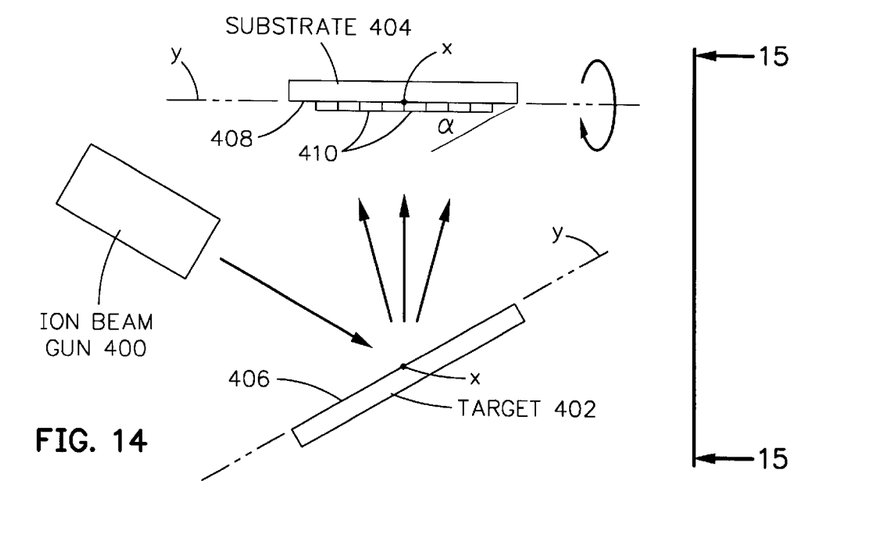
FIG. 14 is a schematic illustration of an ion beam gun, target and substrate.
Figure 15:
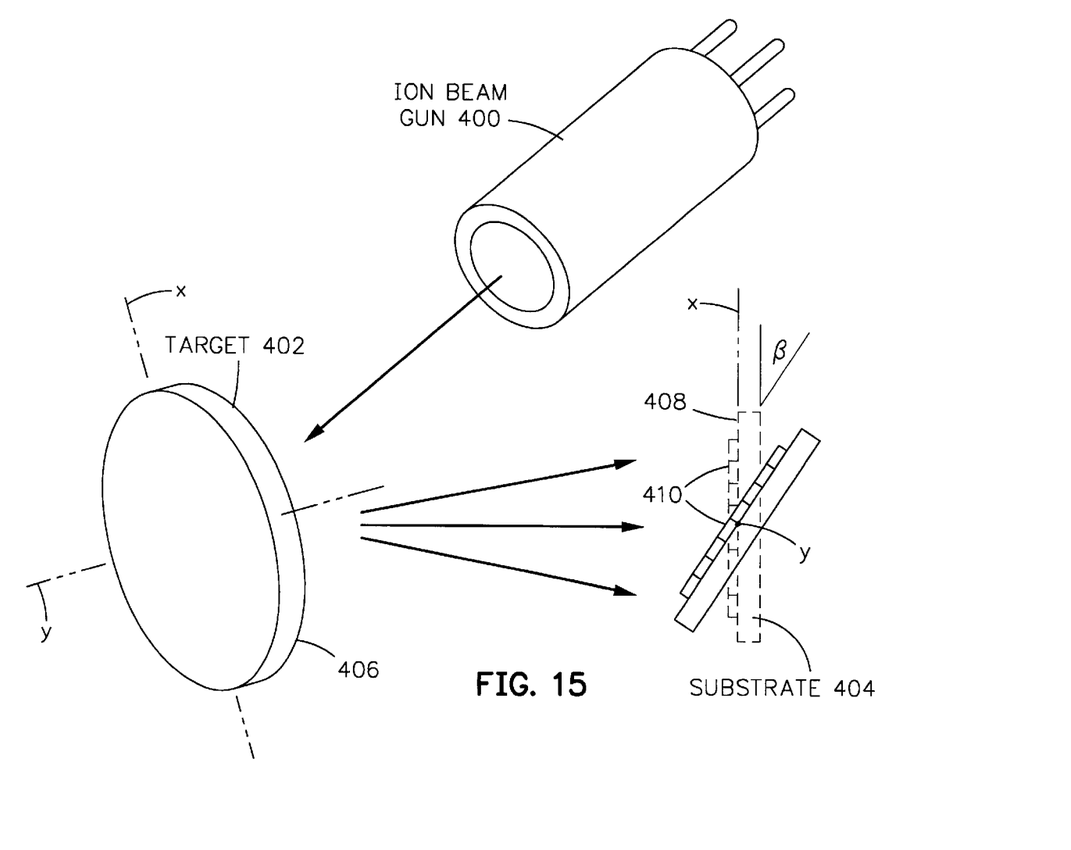
FIG. 15 is a view taken along plane 15—15 of FIG. 14.

FIGS. 14 and 15 are schematic diagrams of an ion beam gun 400, a target 402 of some metal and a substrate 404 to illustrate how the substrate/target or sputtering angle θ in FIG. 13 may comprise rotating one or both of the target 402 and the substrate 404 about one or both of x and y axes within nominal surface planes 406 and 408 respectively. Either angle α or β or a combination of the angles results in oblique ion beam sputtering (non-normal flux flow) from the center of the target to the center of the substrate. Either the target 402 or the substrate 404 may be maintained stationary while the other is rotated by angles α and/or β to achieve a non-parallel relationship of angle θ therebetween as shown in FIG. 13. As an example, FIG. 14 shows the substrate 404 rotated by angle a about the x axis and FIG. 15 shows the substrate rotated by an angle β about the y axis. In this example the substrate/target angle θ in FIG. 13 comprises angles α and β. Alternatively, or in addition the substrate/target angle θ may comprise rotating the target 402 about one or both of the x and y axes on its nominal surface plane 406. A preferred range for either angle α or β is 5° to 50°. FIGS. 14 and 15 show rows and columns of magnetic heads 410 being formed on the substrate 404 with the novel rhodium (Rh) leads. The various layers are shown in FIG. 11 for the read head and in FIGS. 6–10 for the write head.

THE INVENTION

EXAMPLE 1

Figure 16A:
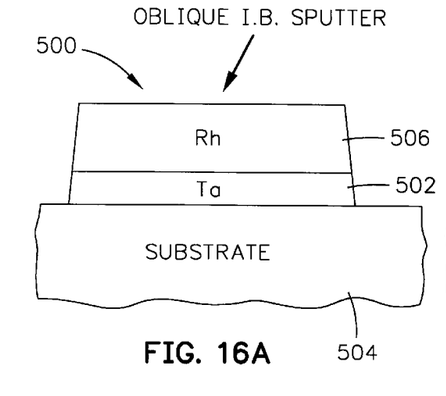
FIG. 16A is an edge view of a first example of a rhodium (Rh) lead after a first step of sputtering.
Figure 16B:
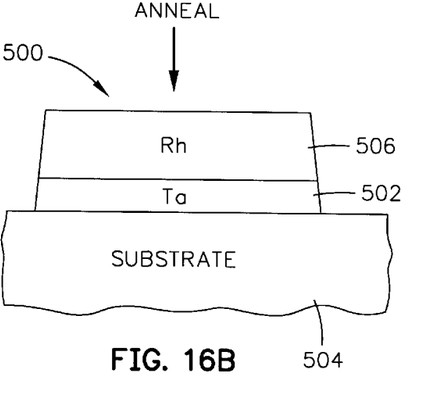
FIG. 16B is an edge view of the first example of the rhodium (Rh) lead after a second step of annealing.

A first embodiment 500 of the present invention is illustrated in FIGS. 16A and 16B wherein in FIG. 16A a first layer of tantalum (Ta) 502 has been sputter deposited on a substrate 504 and a rhodium (Rh) layer 506 has been sputter deposited on the tantalum layer 502 by oblique ion beam sputtering. The tantalum (Ta) layer 502 was 35 Å thick and the rhodium (Rh) layer 506 was 750 Å thick. The substrate/target angle θ comprised an angle α of 40° and an angle β of 20°. The total thickness of the layers, excluding the substrate, was 752 Å. The stress of the rhodium (Rh) layer 506 as deposited was $2.66 \times 10^{10}$ dynes/cm$^2$ and the resistance of the layers 502 and 506 after sputter depositing was 1.62 ohms/sq. After sputter deposition the layers 502 and 506 were subjected to annealing, as shown in FIG. 16B. A first step of annealing was at a temperature of 232° C. for a period of 7 hours. After the first step of annealing the stress of the rhodium (Rh) layer 506 was $4.1 \times 10^9$ dynes/cm$^2$ and the resistance was 1.37 ohms/sq. Accordingly, the stress was reduced by a factor of 6.5 and the resistance was reduced by 0.25 ohms/sq. In FIG. 16B the layers were then subjected to a second step of annealing which was 270° C. for a period of 7 hours. After the second step of annealing the resistance was reduced to 1.29 ohms/sq. which is a 20.4% reduction in the resistance from the as deposited state. The results of this example are set forth in Chart B hereinbelow.

EXAMPLE 2

Figure 17A:
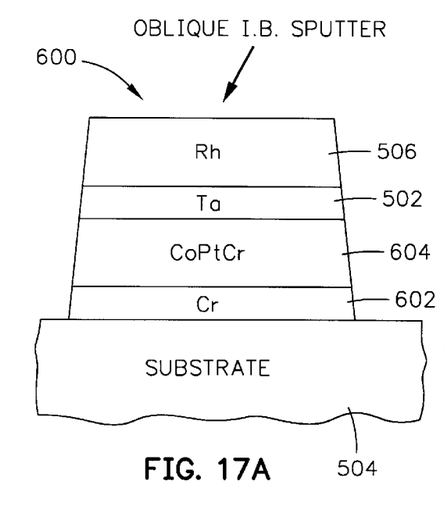
FIG. 17A is an edge view of a second example of a rhodium (Rh) lead after a first step of sputtering.
Figure 17B:
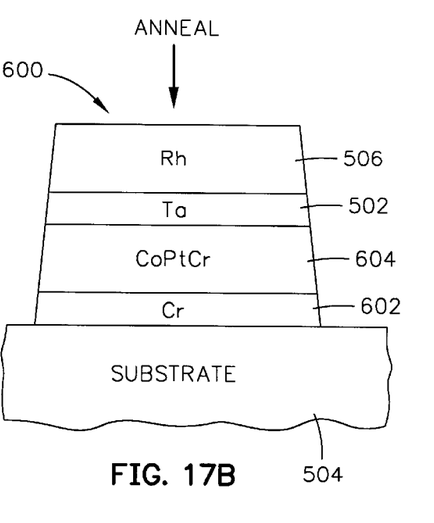
FIG. 17B is an edge view of the second example of the rhodium (Rh) lead after a second step of annealing.

The second example 600 of the present invention is illustrated in FIGS. 17A and 17B. The second example 600 is the same as the first example 500, except a layer 602 of chromium (Cr) was first sputter deposited on the substrate 504 and a layer of cobalt platinum chromium (CoPtCr) 304 was sputter deposited on the chromium (Cr) layer 602. The chromium (Cr) layer 602 was 35 Å thick and the cobalt platinum chromium (CoPtCr) layer 604 was 250 Å thick. The total thickness of all of the layers, excluding the substrate, was 995 Å. The layers were ion beam obliquely sputtered at the aforementioned angle α of 40° and angle β of 20°. After oblique ion beam sputter deposition the rhodium (Rh) layer 506 had a stress of $1.94 \times 10^{10}$ dynes/cm$^2$ and the resistance was 1.44 ohms/sq. The embodiment 600 was then subjected to annealing, as shown in FIG. 17B. A first step of annealing subjected the embodiment 600 to a temperature of 232° C. for a period of 7 hours. After the first step of annealing the stress of the rhodium (Rh) layer 506 was $4.1 \times 10^9$ dynes/cm$^2$ and the resistance was 1.23 ohms/sq. Accordingly, the stress was reduced by a factor of 4.7 and the resistance was reduced by 0.19 ohms/sq. The example 600 in FIG. 15B was then subjected to a second step of annealing which was at a temperature of 270° C. for a period of 7 hours. The resistance of the layers was reduced to 1.16 ohms/sq. which was a reduction of 19.4% from the resistance from the as deposited state. The results of example 2 are shown in Chart B hereinbelow.

EXAMPLE 3

Figure 18A:
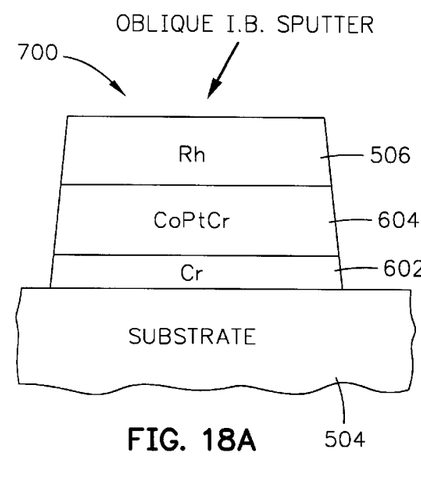
FIG. 18A is an edge view of a third example of a rhodium (Rh) lead after a first step of sputtering.
Figure 18B:
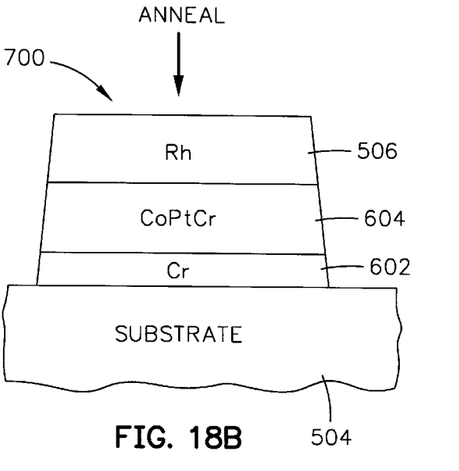
FIG. 18B is an edge view of the third example of the rhodium (Rh) lead after a second step of annealing.

A third example 700 of the present invention is illustrated in FIGS. 18A and 18B. Example 700 is the same as the example 600 except the tantalum (Ta) layer 502 has been omitted. In FIG. 18A all of the layers 602, 604 and 506 were obliquely ion beam sputtered with an angle α of 40° and an angle β of 20°. After sputter deposition the stress of the rhodium (Rh) layer 506 was $1.28 \times 10^{10}$ and the resistance was 1.27 ohms/sq. After sputter deposition the embodiment 700 was subjected to annealing, as shown in FIG. 18B. The first step of annealing was at a temperature of 232° C. for a period of 7 hours. After the first step of annealing the stress of the rhodium (Rh) layer 506 was $3.6 \times 10^9$ and the resistance was 1.18 ohms/sq. The stress had been reduced by a factor of 3.5 and the resistance had been reduced by 0.19 ohms/sq. The embodiment 700 in FIG. 18B was then subjected to a second step of annealing at 270° C. for a period of 7 hours. The resistance after the second step of annealing was 1.14 ohms/sq. which was a 10.2% reduction from the resistance in the as deposited state. The results from example 3 are shown in Chart B hereinbelow.

Figure 19A:
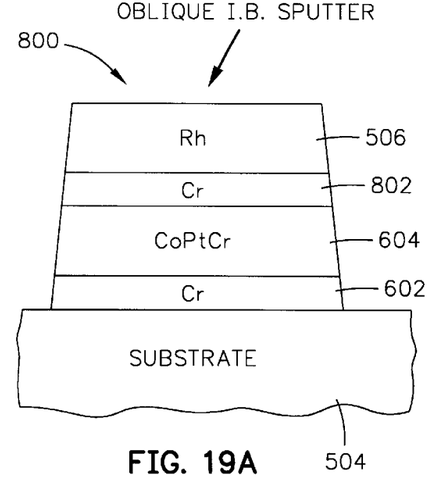
FIG. 19A is an edge view of a fourth example of a rhodium (Rh) lead after a first step of sputtering.
Figure 19B:
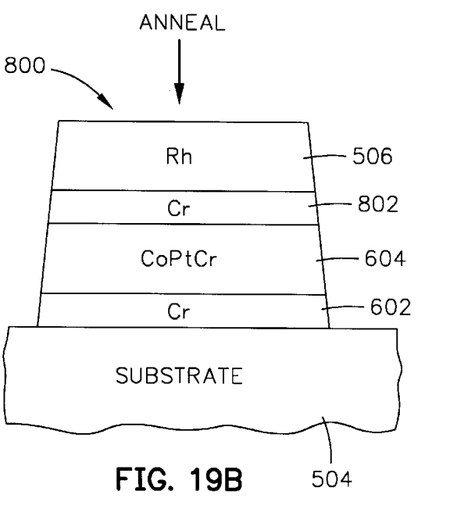
FIG. 19B is an edge view of the fourth example of the rhodium (Rh) lead after a second step of annealing.

Chart A shows the saturation moment $M_S$, remnant magnetization $M_r$, squareness $M_r/M_S$ and hard axis coercivity $H_c$ after the aforementioned annealing steps in FIG. 19B. It can be seen that there is little change in $M_S$, squareness $M_r/M_s$ and $H_C$ after the annealing steps which shows that Example 3 is very desirable for magnetic head fabrication since a seed layer is not required between the hard bias layer 604 and the rhodium (Rh) lead 506.

CHART A

| Properties | $M_S$ (memu) | $M_r$ (memu) | Sq. ($M_r/M_S$) | $H_C$ (Oersteds) |
|---|---|---|---|---|
| As deposited | 3.79 | 3.54 | 0.93 | 1490 |
| 232° C. anneal 7 hrs | 3.71 | 3.49 | 0.94 | 1459 |
| 270° C. 7 hr. anneal | 3.76 | 3.5 | 0.93 | 1463 |

EXAMPLE 4

A fourth example 800 of the present invention is shown in FIGS. 19A and 19B. The example 800 is the same as the example 600 in FIGS. 17A and 17B except a chromium (Cr) layer 802 has been substituted for the tantalum (Ta) layer 502. The chromium (Cr) layer 802 was 35 Å thick. The total thickness of the layers, excluding the substrate, was 976 Å. After the aforementioned oblique ion beam sputter deposition the stress of the rhodium (Rh) layer 506 was $2.2 \times 10^{10}$ dynes/cm$^2$ and the resistance of the layers was 1.24 ohms/sq. Next, the embodiment 800 was subjected to annealing, as shown in FIG. 19B. In a first step of annealing the embodiment was subjected to a temperature of 232° C. for a period of 7 hours. After the first step of annealing the stress of the layers was $3.8 \times 10^9$ and the resistance was 1.20 ohms/sq. Accordingly, the stress was reduced by a factor of 5.8 and the resistance was reduced by 0.04 ohms/sq. The embodiment 800 was then subjected to a second step of annealing which was at a temperature of 270° C. for 7 hours. After the second step of annealing the resistance of the layers was 1.1 ohms/sq. which was a reduction of 11.3% from the as deposited resistance. The results from example 4 are shown in Chart B hereinbelow.

CHART B

| Parameters | Example 1 | Example 2 | Example 3 | Example 4 |
|---|---|---|---|---|
| Structure | Ta/Rh | Cr/CoPtCr/ Ta/Rh | Cr/CoPtCr/ Rh | Cr/CoPtCr/ Cr/Ta |
| Thickness | 752 Å | 995 Å | 940 Å | 976 Å |
| Stress - as deposited films dynes/cm$^2$ | $2.66 \times 10^{10}$ | $1.94 \times 10^{10}$ | $1.28 \times 10^{10}$ | $2.2 \times 10^{10}$ |
| Stress - after 232° C. - 7 hr. anneal dynes/cm$^2$ | $4.1 \times 10^9$ | $4.1 \times 10^9$ | $3.6 \times 10^9$ | $3.8 \times 10^9$ |
| R - as deposited (ohms/sq.) | 1.62 | 1.44 | 1.27 | 1.24 |

CHART B-continued

| Parameters | Example 1 | Example 2 | Example 3 | Example 4 |
|---|---|---|---|---|
| R - after 232° C.-7 hr. anneal (ohms/sq.) | 1.37 | 1.23 | 1.18 | 1.20 |
| R - after 270° C. - 7 hr. anneal | 1.29 | 1.16 | 1.14 | 1.1 |
| % reduction in R | 20.4% | 19.4% | 10.2% | 11.3 % |

Discussion

The cobalt platinum chromium (CoPtCr) layer 604 in examples 2, 3 and 4 is a material that is typically employed for the hard bias layers 140 and 144 in FIG. 11. The chromium (Cr) layer 502 therebelow is typically a seed layer for the hard bias layer. The chromium (Cr) layer 802 in FIGS. 19A and 19B is typically an isolation and/or seed layer. The tantalum (Ta) layer 502 in FIGS. 16A and 16B is simply a seed layer for the rhodium (Rh) layer 506. The rhodium (Rh) lead layer in FIGS. 16A and 16B is an example of a lead layer which can be employed in any electrical device for interconnecting a pair of components. Examples 2, 3 and 4 are typical examples of hard bias and lead layers 134 and 136 for a read sensor as shown in FIG. 11. Example 3 in FIGS. 18A and 18B is a preferred embodiment because without a seed layer or isolation layer between the hard bias layer 604 and the rhodium (Rh) layer 506 stress and resistance are reduced comparable to Examples 2 and 4, as shown in Chart B, where a seed layer or isolation layer is employed. As shown by Chart A, Example 3 also has other favorable properties after annealing as discussed hereinabove. While the preferred angles α and β for oblique ion beam sputtering are set forth in the examples, the preferred range for each of angles α and β is 5° to 50°. The thicknesses of the layers in Chart B are exemplary and can be varied as desired. While a preferred annealing is 232° C. for a period of 7 hours, the annealing can be between 140° C. to 300° C. for a period from 0.5 hr. to 10 hr. and still receive a noticeable reduction in stress and resistance of the layers.

It should be understood that the present invention may be employed for metals other than rhodium (Rh). Further, the sensor may be a spin valve sensor or an AMR sensor, as discussed hereinabove. Further, the first and second leads may overlap the top of various layers of the sensor with a space between the leads for defining the active region of the sensor. This is known in the art as a continuous junction sensor as contrasted to the contiguous junction sensor described hereinabove. Still further, the invention applies to any thin film leads, such as leads connected to the write head of a magnetic head assembly, leads connected to the top and bottom of a tunnel magnetoresistive (TMR) head or leads in an integrated circuit device.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making rows and columns of magnetic read heads wherein each magnetic read head has first and second rhodium (Rh) electrical leads comprising the steps of:

providing a wafer substrate with a nominal surface plane;
forming rows and columns of ferromagnetic first shield layers on the wafer substrate;
forming rows and columns of nonmagnetic nonconductive first read gap layers on the rows and columns of the first shield layers;
forming rows and columns of read sensors on the rows and columns of first read gap layers;
forming rows and columns of first and second rhodium (Rh) leads on the first read gap layer with each of said first and second leads connected to a respective read sensor comprising the steps of:
providing a chamber with an ion beam gun, a target of rhodium (Rh) and said wafer substrate wherein the target has a nominal surface plane;
orienting the nominal surface plane of the wafer substrate and the nominal surface plane of the target at a substrate/target angle with respect to one another; and
directing ions from the ion beam gun onto the target to sputter rhodium (Rh) atoms therefrom onto the wafer substrate to form one of said rhodium (Rh) leads thereon;
forming rows and columns of nonmagnetic nonconductive second read gap layers on the rows and columns of first read gap layers, the rows and columns of sensors and the rows and columns of first and second rhodium (Rh) leads;
forming rows and columns of ferromagnetic second shield layers on the rows and columns of second read gap layers; and
after forming said rows and columns of first and second rhodium (Rh) leads annealing the rows and columns of rhodium (Rh) leads to form rows and columns of said first and second rhodium (Rh) electrical leads connected to said rows and columns of magnetic read heads.

2. A method as claimed in claim 1 wherein:

said substrate/target angle comprises rotating one of the substrate and the target about one or both of x and y axes within a respective nominal surface plane;
rotation about the x axis results in angle β between the nominal surface planes and rotation about the y axis results in angle β between the nominal surface planes; and
one or both of angles α and β being within a range of 5°–50°.

3. A method as claimed in claim 2 wherein the rows and columns of rhodium (Rh) leads are annealed at a temperature from 140° C. to 300° C. for a period from ½ hour to 10 hours.

4. A method as claimed in claim 3 wherein the rows and columns of rhodium (Rh) leads are annealed at a temperature of 232° C. for a period of 7 hours.

5. A method as claimed in claim 1 including depositing a cobalt platinum chromium (CoPtCr) layer directly in contact with each of said rhodium (Rh) leads.

6. A method of making rows and columns of magnetic read and write heads on a wafer substrate with first and second rhodium (Rh) electrical leads connected to each respective read head comprising the steps of:

providing a wafer substrate with a nominal surface plane;
forming rows and columns of ferromagnetic first shield layers on the wafer substrate;
forming rows and columns of nonmagnetic nonconductive first read gap layers on the rows and columns of the first shield layers;

forming rows and columns of read sensors on the rows and columns of the first read gap layers;

forming rows and columns of first and second rhodium (Rh) leads on the first read gap layer with each of said first and second leads connected to a respective read sensor comprising the steps of:

provided a chamber with an ion beam gun, a target of rhodium (Rh) and said wafer substrate wherein the target has a nominal surface plane;

orienting the nominal surface plane of the wafer substrate and the nominal surface plane of the target at substrate/target angle with respect to one another; and directing ions from the ion beam gun onto the target to sputter rhodium (Rh) atoms therefrom onto the wafer substrate to form one of said rhodium (Rh) leads thereon;

forming rows and columns of nonmagnetic nonconductive second read gap layers on the rows and columns of first read gap layers, the rows and columns of sensors and the rows and columns of first and second rhodium (Rh) leads;

forming rows and columns of ferromagnetic first pole piece layers on the rows and columns of second read gap layers wherein each pole piece layer has a yoke region between a pole tip region and a back gap region;

forming rows and columns of write gap layers between rows and columns of pole tip regions of the pole piece layers;

forming rows and columns of insulation stacks wherein each insulation stack contains one or more write coil layers between rows and columns of yoke regions of the pole piece layers;

connecting the rows and columns of first and second pole piece layers at their back gap regions; and after forming said rows and columns of said first and second rhodium (Rh) leads, annealing the rows and columns of rhodium (Rh) leads to form rows and columns of said first and second rhodium (Rh) electrical leads connected to said rows and columns of magnetic read heads.

7. A method as claimed in claim 6 further comprising the steps of:

forming rows and columns of ferromagnetic second shield layers between the rows and columns of second read gap layers and the rows and columns of first pole piece layers; and forming rows and columns of isolation layers between the rows and columns of second shield layers and the rows and columns of first pole piece layers.

8. A method as claimed in claim 6 wherein:

said substrate/target angle comprises rotating one of the substrate and the target about one or both of x and y axes within a respective nominal surface plane;

rotation about the x axis results in angle $\alpha$ between the nominal surface planes and rotation about the y axis results in angle $\beta$ between the nominal surface planes; and one or both of angles $\alpha$ and $\beta$ being within a range of 5°–50°.

9. A method as claimed in claim 8 wherein the rows and columns of rhodium (Rh) leads are annealed at a temperature from 140° C. to 300° C. for a period from ½ hour to 10 hours.

10. A method as claimed in claim 9 wherein the rows and columns of rhodium (Rh) leads are annealed at a temperature of 232° C. for a period of 7 hours.

11. A method as claimed in claim 6 including depositing a cobalt platinum chromium (CoPtCr) layer directly in contact with each of said rhodium (Rh) leads.

* * * * *

UNITED STATES PATENT AND TRADEMARK OFFICE
CERTIFICATE OF CORRECTION

PATENT NO.    : 6,460,243 B1
DATED         : October 8, 2002
INVENTOR(S)   : Mustafa Pinarbasi It is certified that error appears in the above-identified patent and that said Letters Patent is hereby corrected as shown below:

<u>Title page,</u>
Item [56], add after the listing of FOREIGN PATENT DOCUMENT,
    -- PUBLICATIONS
IBM Technical Disclosure Bulletin, Vol. 21, No. 7, p. 2987, 12/78 --

<u>Column 10,</u>
Line 42, change "β" to -- α --

Signed and Sealed this

Twenty-seventh Day of May, 2003

JAMES E. ROGAN
*Director of the United States Patent and Trademark Office*